US010145084B2

(12) United States Patent
Fredrickson

(10) Patent No.: US 10,145,084 B2
(45) Date of Patent: Dec. 4, 2018

(54) CONTROL SYSTEM FOR A WORK MACHINE

(71) Applicant: Caterpillar SARL, Geneva (CH)

(72) Inventor: Andrew Arnold Fredrickson, Holly Springs, NC (US)

(73) Assignee: Caterpillar SARL, Geneva (CH)

( * ) Notice: Subject to any disclaimer, the term of this patent is extended or adjusted under 35 U.S.C. 154(b) by 198 days.

(21) Appl. No.: 15/244,693

(22) Filed: Aug. 23, 2016

(65) Prior Publication Data

US 2018/0058038 A1 Mar. 1, 2018

(51) Int. Cl.

| | |
|---|---|
| ***B60K 26/00*** | (2006.01) |
| ***E02F 9/20*** | (2006.01) |
| ***G05G 9/047*** | (2006.01) |
| ***G05G 1/30*** | (2008.04) |
| ***E02F 3/34*** | (2006.01) |

(52) U.S. Cl.

CPC .......... *E02F 9/2004* (2013.01); *E02F 3/3414* (2013.01); *G05G 1/30* (2013.01); *G05G 9/047* (2013.01)

(58) Field of Classification Search

CPC ..... G05G 9/02; G05G 9/04792; E02F 9/2004; E02F 3/431; E02F 9/16; F15B 13/0424; Y10T 74/20012; B62D 33/0617; B62D 33/073; B62D 49/02

USPC .......................................................... 180/315

See application file for complete search history.

(56) References Cited

U.S. PATENT DOCUMENTS

| | | | | |
|---|---|---|---|---|
| 5,953,196 | A | 9/1999 | Zimmermann | |
| 5,984,040 | A | 11/1999 | Lee | |
| 6,189,401 | B1 | 2/2001 | Atwell et al. | |
| 7,784,581 | B1 * | 8/2010 | Klas | E02F 9/166 180/329 |
| 8,066,567 | B2 | 11/2011 | Waggoner et al. | |
| 8,931,586 | B2 | 1/2015 | Wakino et al. | |
| 2003/0141133 | A1 * | 7/2003 | Yanaka | G05G 5/03 180/315 |
| 2005/0016822 | A1 | 1/2005 | Colliar et al. | |
| 2008/0184841 | A1 * | 8/2008 | Blind | A01B 63/00 74/491 |
| 2009/0055058 | A1 * | 2/2009 | Morris | E02F 9/2004 701/50 |
| 2013/0261902 | A1 * | 10/2013 | Zhdanov | E02F 3/7613 701/50 |

(Continued)

*Primary Examiner* — Toan C To

(74) *Attorney, Agent, or Firm* — Miller, Matthias & Hull

(57) ABSTRACT

A control system for a work machine is disclosed that may include an input device, an electronic controller, and a joystick. The input device may be configured to transmit an electronic selection signal. The electronic controller may be in electronic communication with the input device, be configured to receive the electronic selection signal, and transmit an electronic configuration signal. The joystick may be in operative communication with at least one of a ground engaging member and a work implement and be configured to regulate movement of at least one of these. Further, the joystick may be in electronic communication with the electronic controller and may be configured to move along multiple axes. The joystick may be further configured to receive the electronic configuration signal and be selectively non-movable along at least one of its axes in response to this signal.

14 Claims, 11 Drawing Sheets

(56) References Cited

U.S. PATENT DOCUMENTS

| | | | | |
|---|---|---|---|---|
| 2013/0306395 | A1* | 11/2013 | Frazier | E02F 9/2004 180/333 |
| 2014/0251070 | A1 | 9/2014 | Kornelson | |
| 2015/0368875 | A1 | 12/2015 | Cook et al. | |
| 2016/0202721 | A1* | 7/2016 | Bernardy | G06F 3/038 74/471 XY |
| 2017/0058488 | A1* | 3/2017 | Wright | E02F 9/2004 |
| 2017/0121943 | A1* | 5/2017 | Lee | E02F 9/2004 |
| 2018/0172039 | A1* | 6/2018 | Du | F15B 21/14 |
| 2018/0202127 | A1* | 7/2018 | Murota | B62D 1/22 |

* cited by examiner

CONTROL SYSTEM FOR A WORK MACHINE

TECHNICAL FIELD

This disclosure generally relates to a work machine and, more particularly, to a control system for a work machine.

BACKGROUND

Work machines, such as skid steer loaders, multi-terrain loaders, track loaders, excavators, and bulldozers are used in a variety of industries, such as construction, agriculture, and earth-moving. Generally speaking, these machines include a frame, and a power source supported by the frame. Moreover, these machines include a control system for governing operation of the machine. The control system may include a multi-axis joystick configured to regulate movement of the work machine. The control system may also include another multi-axis joystick configured to regulate movement of an accessory or work implement, such as, a bucket, blade, or forks, for example.

Further, the control system may include a foot pedal. The foot pedal may be used to control the engine speed of the work machine. Alternatively, the foot pedal may be used to provide similar functions as the multi-axis joysticks described above. For example, forward and backward movement of the work machine may be controlled by the foot pedal rather than one of the multi-axis joysticks.

However, when a foot pedal is used in conjunction with multi-axis joysticks, and performs a function that is typically associated with one of the multi-axis joysticks, the joystick ends up with "dead functionality." That is, the multi-axis joystick is allowed to move along one of its axes without any corresponding action being undertaken by the work machine. From an operator perspective, dead functionality fails to deliver the expected response and feel over the control of the work machine.

U.S. Pat. No. 8,931,586 ("Wakino") discloses a joystick that is mechanically engaged with a lock switch. The joystick is capable of moving along any of its axes when the lock switch is disengaged. On the other hand, the joystick is incapable of moving along any of its axes when the lock switch is engaged. Wakino discloses that its joystick is either fully functional, or fully non-functional, along its axes in response to engagement with the lock switch.

The present disclosure is directed to overcoming one or more problems set forth above and/or other problems associated with the prior art.

SUMMARY

In accordance with one aspect of the present disclosure, a control system for a work machine is disclosed. The control system may include an input device configured to transmit an electronic selection signal, and further comprise an electronic controller in electronic communication with the input device that is configured to receive the electronic selection signal and transmit an electronic configuration signal in response to the electronic selection signal. The control system may also include a joystick in operative communication with at least one of a ground engaging member and a work implement. The joystick may be configured to regulate movement of at least one of the ground engaging member and the work implement. Further, the joystick may be in electronic communication with the electronic controller and be configured to move between a first position and a second position about a first rotational axis and a third position and a fourth position about a second rotational axis. The joystick may further be configured to receive the electronic configuration signal and be selectively non-movable between at least one of the first position and the second position and the third position and the fourth position in response to the electronic configuration signal.

In accordance with another aspect of the present disclosure, a work machine is disclosed. The work machine may include a frame, a power source supported by the frame, and a ground engaging member rotatably associated with the power source and configured to move the work machine about a work site. Additionally, the work machine may include a work implement operatively coupled with a work arm and configured to move between an engagement position and a non-engagement position. The work machine may also include an input device configured to transmit an electronic selection signal, and further comprise an electronic controller in electronic communication with the input device that is configured to receive the electronic selection signal and transmit an electronic configuration signal in response to the electronic selection signal. Additionally, the work machine may include a joystick in operative communication with at least one of a ground engaging member and a work implement and the joystick may be configured to regulate movement of at least one of the ground engaging member and the work implement. Further, the joystick may be in electronic communication with the electronic controller and be configured to move between a first position and a second position about a first rotational axis and a third position and a fourth position about a second rotational axis. The joystick may further be configured to receive the electronic configuration signal and be selectively non-movable between at least one of the first position and the second position and the third position and the fourth position in response to the electronic configuration signal.

In accordance with another embodiment of the present disclosure, a method of operating a work machine is disclosed. The method may include receiving by an electronic controller an electronic selection signal from an input device. Additionally, an electronic configuration signal may be transmitted to at least one of a first joystick and a first foot pedal in response to the electronic configuration signal. The first joystick may be configured to move between a first position and a second position about a first rotational axis and a third position and a fourth position about a second rotational axis. The first foot pedal may be configured to move between a fifth position and a sixth position about a fifth rotational axis and between the sixth position and a seventh position about the fifth rotational axis. Movement of at least one of the first joystick and the first foot pedal may be selectively limited in response to the electronic configuration signal.

These and other aspects and features of the present disclosure will be more readily understood when read in conjunction with the accompanying drawings.

BRIEF DESCRIPTION

DETAILED DESCRIPTION OF THE DISCLOSURE

Figure 1:
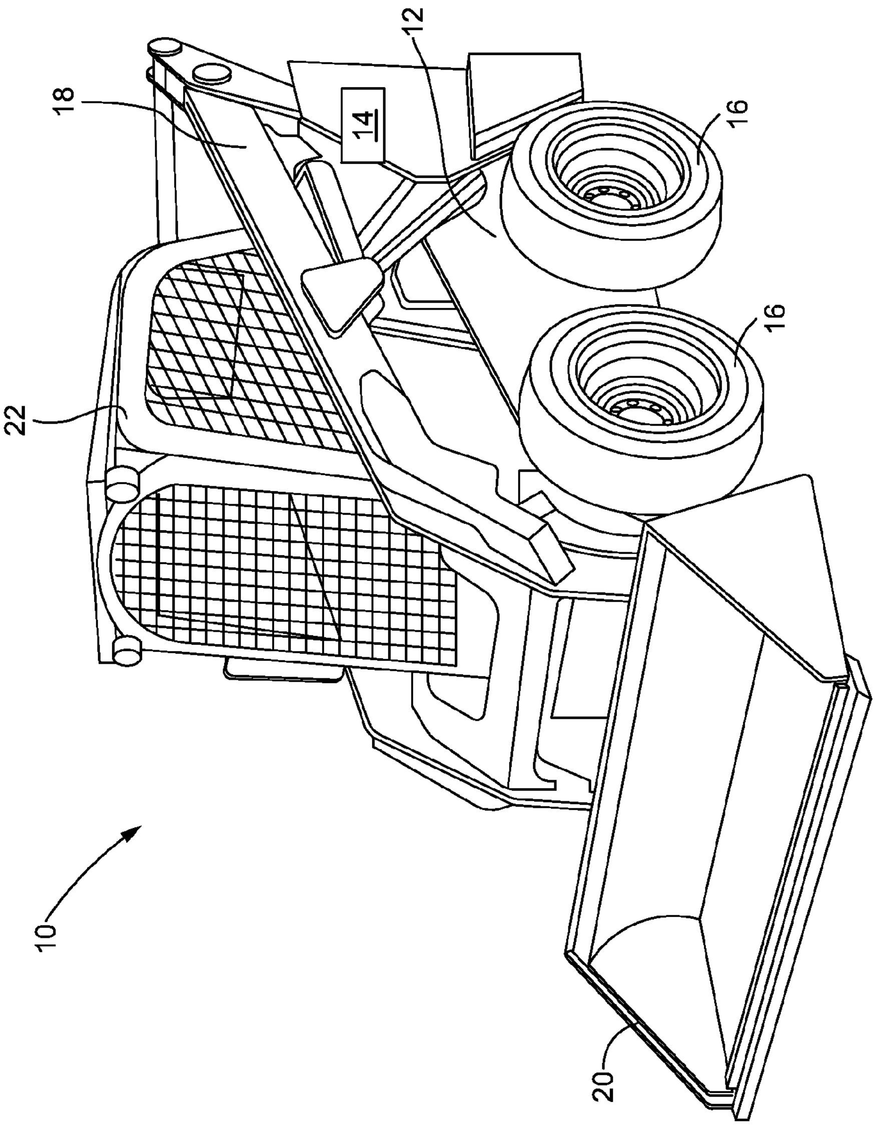
FIG. 1 is side perspective view of a work machine manufactured in accordance with the present disclosure.

Various aspects of the disclosure will now be described with reference to the drawings, wherein like reference numbers refer to like elements, unless specified otherwise. Referring now to the drawings and with specific reference to FIG. 1, a work machine is disclosed and generally referred to by reference numeral 10. The work machine 10 may include a frame 12, and a power source 14 supported by the frame 12. The power source 14 may be provided in any number of different forms including, but not limited to, Otto and Diesel cycle internal combustion engines, electric motors, gas turbine engines, and the like.

The work machine 10 may include a ground engaging member 16 rotatably associated with the power source 14. The ground engaging member 16 may be configured to move the work machine 10 about a work site. While the ground engaging member 16 depicted is a tire, another form of the ground engaging member 16 is certainly possible. For example, rubber or metal endless tracks may be utilized with the work machine 10 of the current disclosure.

The work machine 10 may also include a work arm 18 pivotably coupled with the frame 12, and a work implement 20 may be operatively coupled with the work arm 18. The work implement 20 may be configured to engage a material being worked on by the work machine 10. Although the work implement 20 depicted in FIG. 1 is a bucket, another type of work implement 20, such as, a blade, forks, a grapple bucket, or a front hoe, for example, may be used.

Additionally, the work machine 10 may include an operator station 22. One example of an operator station 22 that may be used in conjunction with the work machine of FIG. 1 is depicted in the top elevation view of FIG. 2. As is illustrated therein, the operator station 22 may include at least one or more control devices, such as a first joystick 24, a second joystick 26, a first foot pedal 28, and a second foot pedal 30. The control devices may be configured to regulate movement of at least one of the ground engaging member 16, the work arm 18, and the work implement 20. While the operator station 22 depicted in FIGS. 1 and 2 is a part of the work machine 10, it does not have to be. For example, it is envisioned that the work machine 10 may be controlled remotely, from, for example, a remote control transmitter that is in wired, or wireless, communication with the work machine 10, wherein an operator is in view of the work machine. Alternatively, it is envisioned that the operator station 22 may be located many feet to miles away from the work machine 10, and wherein this operator station 22 is in wired or wireless communication with the work machine 10 over a local area network, or a wide area network, for example.

Figure 2:
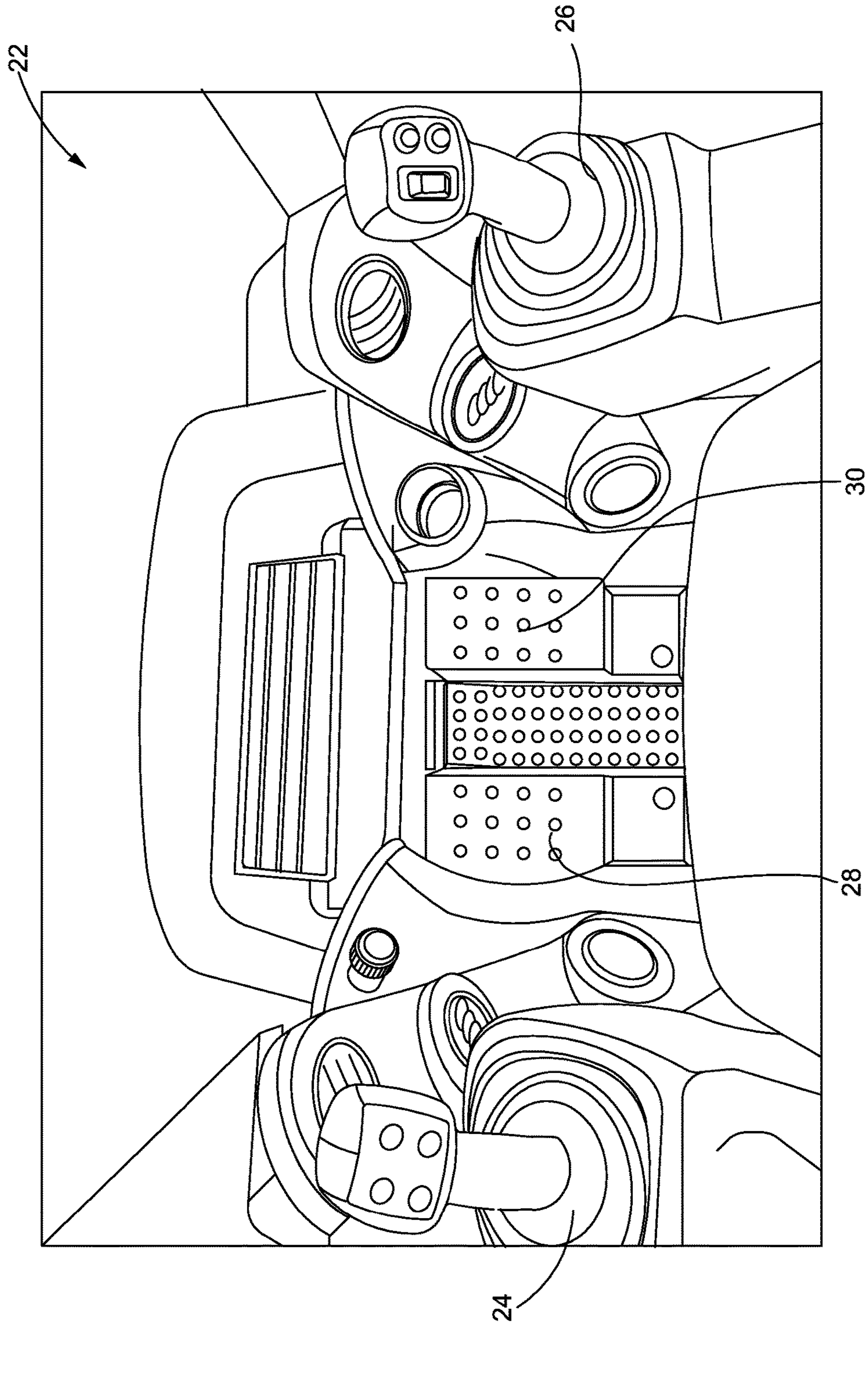
FIG. 2 is a top elevation view of an exemplary operator station that may be used in conjunction with the work machine of FIG. 1.
Figure 3:
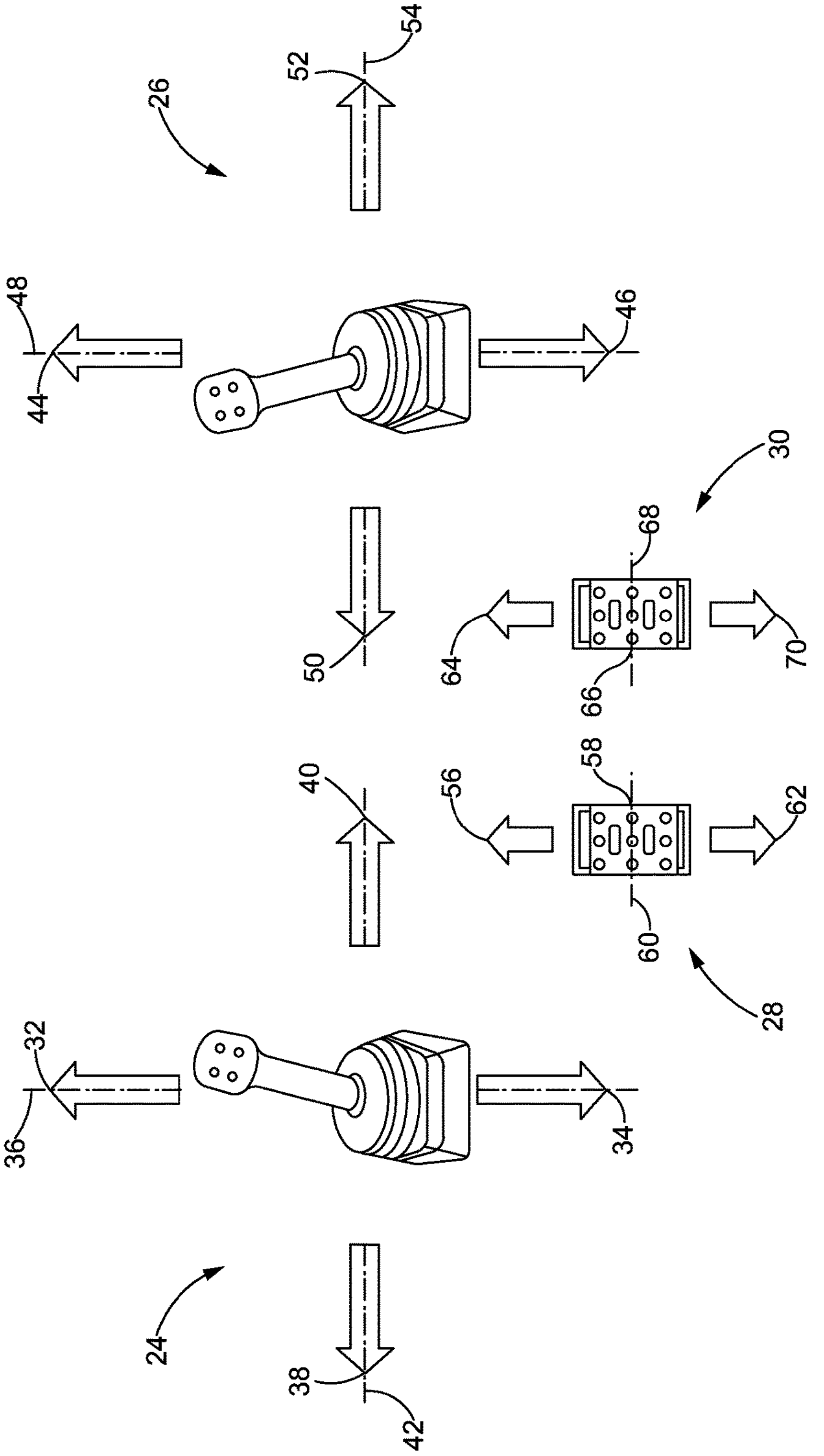
FIG. 3 is a schematic depicting a range of movement of exemplary control devices that may be used in conjunction with the work machine of FIG. 1.

FIG. 3 is a schematic depicting a range of movement of exemplary control devices that may be utilized in conjunction with the work machine 10 of FIG. 1. As seen therein, the control devices may include the first joystick 24, the second joystick 26, the first foot pedal 28, and the second foot pedal 30. The first joystick 24 may be configured to move between a first position 32 and a second position 34 about a first rotational axis 42, and between a third position 38 and a fourth position 40 about a second rotational axis 36. The second joystick 26 may be configured to move between an eighth position 44 and a ninth position 46 about a third rotational axis 54, and between a tenth position 50 and an eleventh position 52 about a fourth rotational axis 48.

As is also depicted in this figure, the first foot pedal 28 may be configured to move between a fifth position 56 and a sixth position 58 about a fifth rotational axis 60. Furthermore, the first foot pedal 28 may be configured to move between the sixth position 58 and a seventh position 62 about the fifth rotational axis 60. The second foot pedal 30 may be configured to move between a twelfth position 64 and a thirteenth position 66 about a sixth rotational axis 68, and further between the thirteenth position 66 and a fourteenth position 70 about the sixth rotational axis 68.

Figure 4:
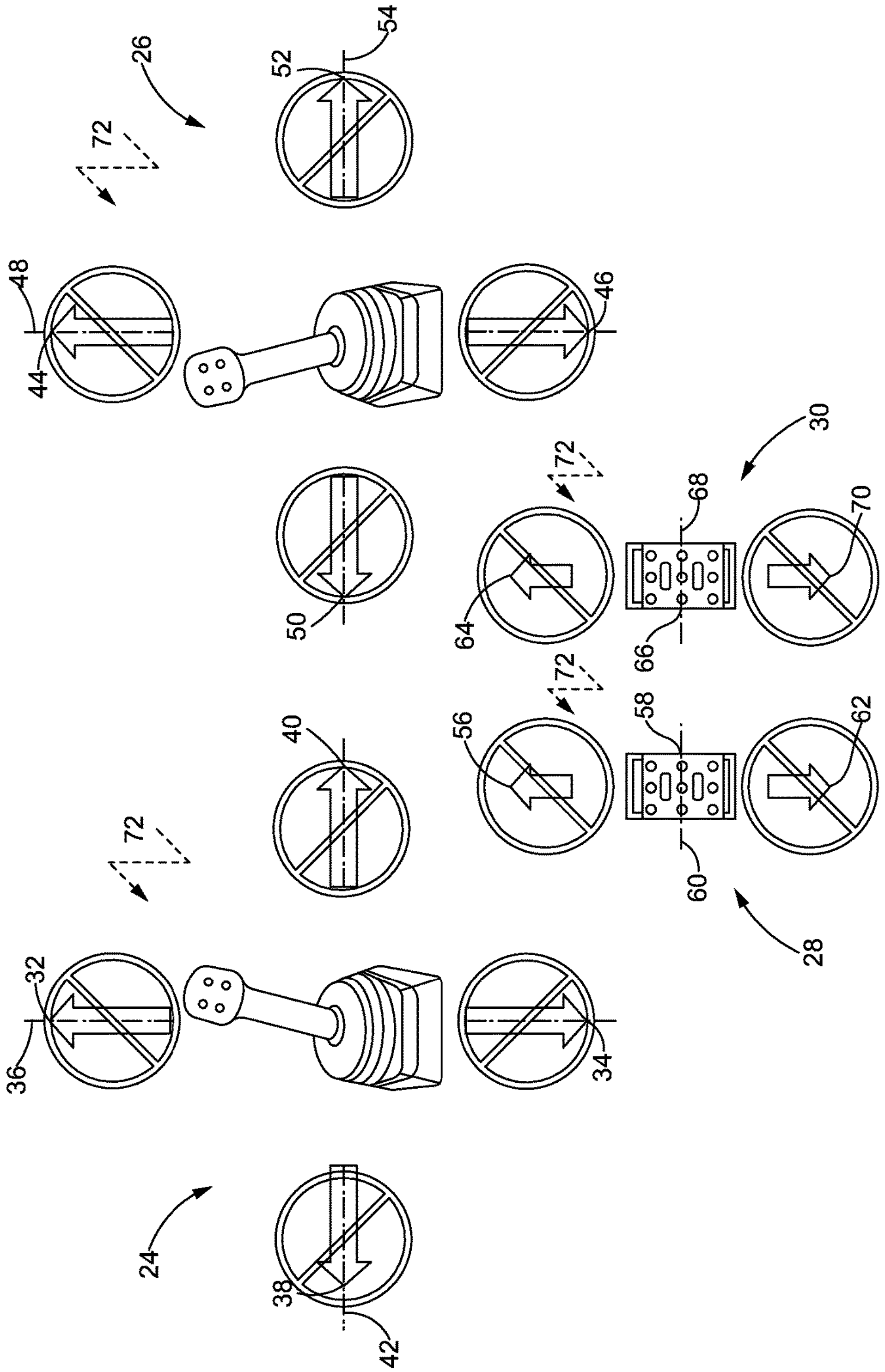
FIG. 4 is a schematic depicting a range of non-movement of the exemplary control devices of FIG. 3 that may be used in conjunction with the work machine of FIG. 1.

Referring now to FIG. 4, a range of non-movement of the exemplary control devices of FIG. 3 is depicted. The first joystick 24 may be non-movable between the first position 32 and the second position 34 in response to an electronic configuration signal 72. Alternatively, and independently, the first joystick 24 may be non-movable between the third position 38 and the fourth position 40 in response to the electronic configuration signal 72. Accordingly, the first joystick 24 may be selectively non-movable between at least one of the first position 32 and the second position 34, and the third position 38 and the fourth position 40, in response to the electronic configuration signal 72.

In another embodiment, the electronic configuration signal 72 may be a magnetic configuration signal, and the first joystick 24 may be a magnetically responsive joystick configured to receive the magnetic configuration signal and be selectively non-movable between at least one of the first position 32 and the second position 34, and the third position 38 and the fourth position 40, in response to the magnetic configuration signal. In an additional embodiment, the magnetically responsive joystick may include a magnetorheological material configured to increase its apparent viscosity in response to the magnetic configuration signal, and the magnetically responsive joystick may be configured to be selectively non-movable between at least one of the first position 32 and the second position 34, and the third position 38 and the fourth position 40, in response to the increase in apparent viscosity of the magnetorheological material.

The second joystick 26 mirrors the first joystick 24. Accordingly, the second joystick 26 may be selectively non-movable between at least one of the eighth position 44 and the ninth position 46, and the tenth position 50 and the eleventh position 52, in response to the electronic configuration signal 72. Further, the second joystick 26 may also be a magnetically responsive joystick configured to receive the magnetic configuration signal and be selectively non-movable between at least one of the eighth position 44 and the ninth position 46, and the tenth position 50 and the eleventh position 52, in response to the magnetic configuration signal. The second joystick 26 may also include a magnetorheological material configured to increase its apparent viscosity in response to the magnetic configuration signal, and therefore may be configured to be selectively non-movable between at least one of the eighth position 44 and the ninth position 46, and the tenth position 50 and the eleventh position 52, in response to the increase in apparent viscosity of the magnetorheological material.

As is further shown in FIG. 4, the first foot pedal 28 may be non-movable between fifth position 56 and the sixth position 58 in response to the electronic configuration signal 72. Independently, the first foot pedal 28 may be non-movable between the sixth position 58 and the seventh position 62 in response to the electronic configuration signal 72. Thus, the first foot pedal 28 may be selectively non-movable between at least one of the fifth position 56 and the sixth position 58, and the sixth position 58 and the seventh position 62, in response to the electronic configuration signal 72.

In an additional aspect of this disclosure, the first foot pedal 28 may be a magnetically responsive foot pedal configured to receive a magnetic configuration signal. Accordingly, when the electronic configuration signal 72 is a magnetic configuration signal, the first foot pedal 28 may be selectively non-movable between at least one of the fifth position 56 and the sixth position 58, and between the sixth position 58 and the seventh position 62, in response to the magnetic configuration signal. In a further embodiment, the first foot pedal 28 may include a magnetorheological material configured to increase its apparent viscosity in response to the magnetic configuration signal. In this instance, the first foot pedal 28 may be configured to be selectively non-movable between at least one of the fifth position 56 and the sixth position 58, and between the sixth position 58 and the seventh position 62, in response to the increase in apparent viscosity of the magnetorheological material.

The second foot pedal 30 mimics the first foot pedal 28. Accordingly, the second foot pedal may be selectively non-movable between at least one of the twelfth position 64 and the thirteenth position 66, and between the thirteenth position 66 and the fourteenth position 70, in response to the electronic configuration signal 72. Additionally, the second foot pedal 30 may also be a magnetically responsive foot pedal configured to receive the magnetic configuration signal and be selectively non-movable between at least one of the twelfth position 64 and the thirteenth position 66, and between the thirteenth position 66 and the fourteenth position 70, in response to the magnetic configuration signal. The second foot pedal 30 may also include a magnetorheological material configured to increase its apparent viscosity in response to the magnetic configuration signal, and therefore may be configured to be selectively non-movable between at least one of the twelfth position 64 and the thirteenth position 66, and between the thirteenth position 66 and the fourteenth position 70, in response to the increase in apparent viscosity of the magnetorheological material.

Figure 5:
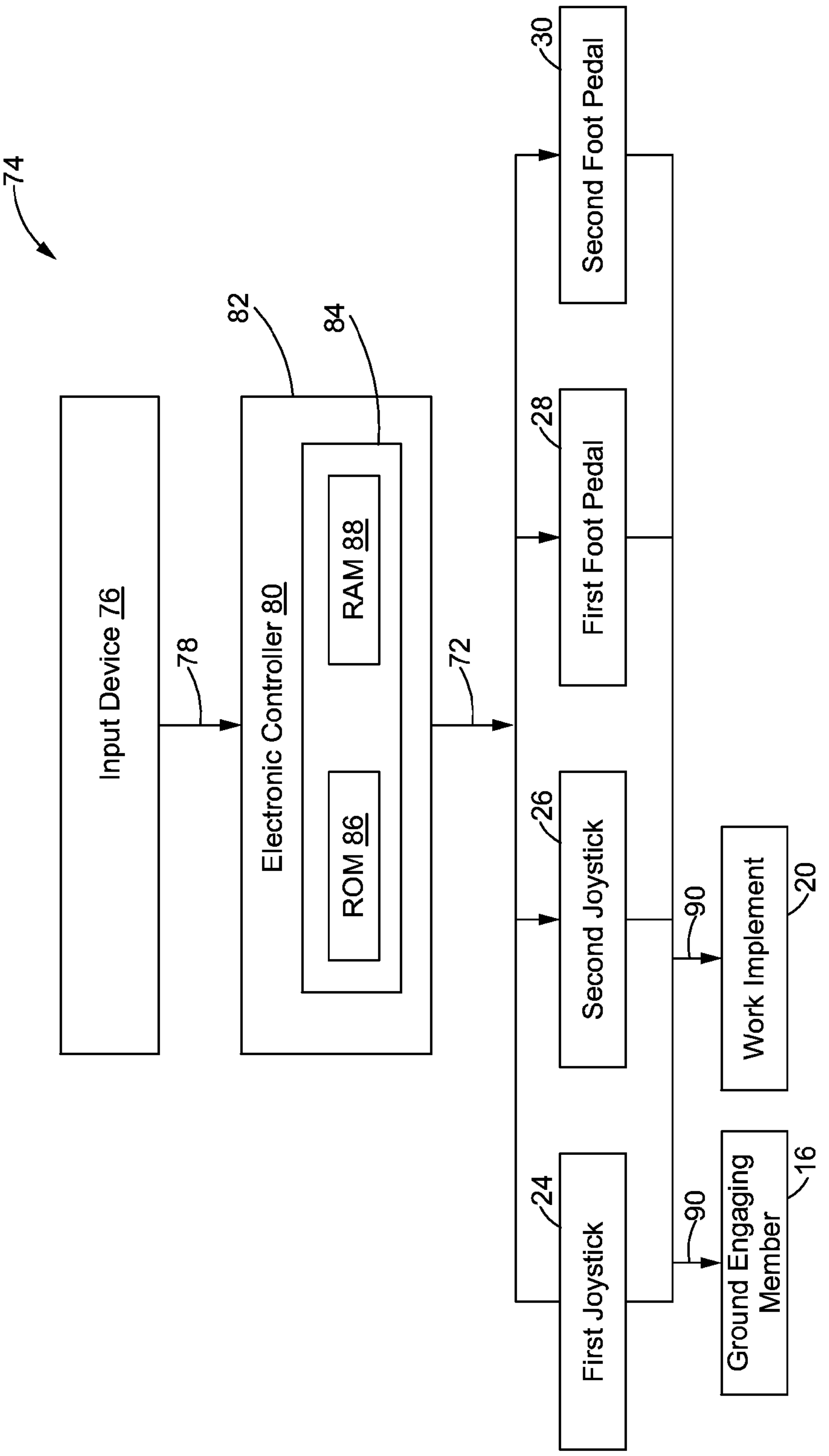
FIG. 5 is a block diagram of an exemplary control system that may be utilized in conjunction with the work machine of FIG. 1.

FIG. 5 is a block diagram depicting an exemplary control system 74 that may be utilized with the work machine 10 of FIG. 1. As illustrated therein, the control system 74 may include an input device 76 configured to transmit an electronic selection signal 78. The electronic selection signal 78 may comprise information including which movements, if any, of the first joystick 24, the second joystick 26, the first foot pedal 28, and the second foot pedal 30, should be locked-out, as described above. Accordingly, the input device 76 may be any tool capable of conveying such information, including the group comprising an operator display, a switch, and a computer.

The control system 74 may also include an electronic controller 80 that may be in electronic communication with the input device 76 and be configured to receive the electronic selection signal 78. The electronic controller 80 may be implemented to control which movements, if any, of the first joystick 24, the second joystick 26, the first foot pedal 28, and the second foot pedal 30, should be locked-out, described before. Although the electronic controller 80 is depicted as being a stand-alone device, it is certainly possible for the electronic controller 80 to be associated with an electronic control module (ECM) for the work machine 10, or even an electronic control unit (ECU) associated with the power source 14.

The electronic controller 80 may include a microprocessor 82 for executing specified programs that control and monitor various functions of the control system 74 including receiving the electronic selection signal 78 and transmitting the electronic configuration signal 72. The microprocessor 82 may be associated with a memory 84, such as read only memory (ROM) 86, for storing a program or programs, and a random access memory (RAM) 88, which serves as a working area for use executing the programs stored in memory 84. Although microprocessor 82 is shown, it is also contemplated to use other electronic components, such as, a microcontroller, an application specific integrated circuit (ASIC) chip, or any other integrated circuit device, that can be operated in accordance with the preprogrammed instructions and/or algorithms disclosed herein.

Each of the first joystick 24, the second joystick 26, the first foot pedal 28, and the second foot pedal 30 may be in electronic communication with the electronic controller 80. As described before, each of these devices may be selectively non-movable between specified positions in response to electronic configuration signal 72. As is also shown, both the first joystick 24, and the second joystick 26, may be in operative communication with at least one of the ground engaging member 16 and the work implement 20, and be configured to regulate movement of at least one of the ground engaging member 16 and work implement by transmitting a movement signal 90. As is additionally depicted, both the first foot pedal 28 and the second foot pedal 30 may be in operative communication with at least one of the ground engaging member 16 and the work implement 20, and may also be configured to regulate movement of at least one of the ground engaging member 16 and work implement 20 by transmitting a movement signal 90.

INDUSTRIAL APPLICABILITY

In general, the present disclosure may find applicability in many industries including, but not limited to, construction, agriculture, and earth-moving, and more particularly, to systems and methods for controlling work machines utilized in these industries. Although applicable to any work machine, the present disclosure may be particularly applicable to a work machine utilizing a joystick in conjunction with a foot pedal while governing work machine operation. As previously described, when a movement of a foot pedal is used to perform a function typically associated with a joystick, the joystick ends up with “dead functionality.” Dead functionality fails to provide an operator with the expected response and feel over the control of the work machine. The present disclosure finds usefulness by mitigating dead functionality, and consequently, improving the response and feel over the control of the work machine.

Figure 6:
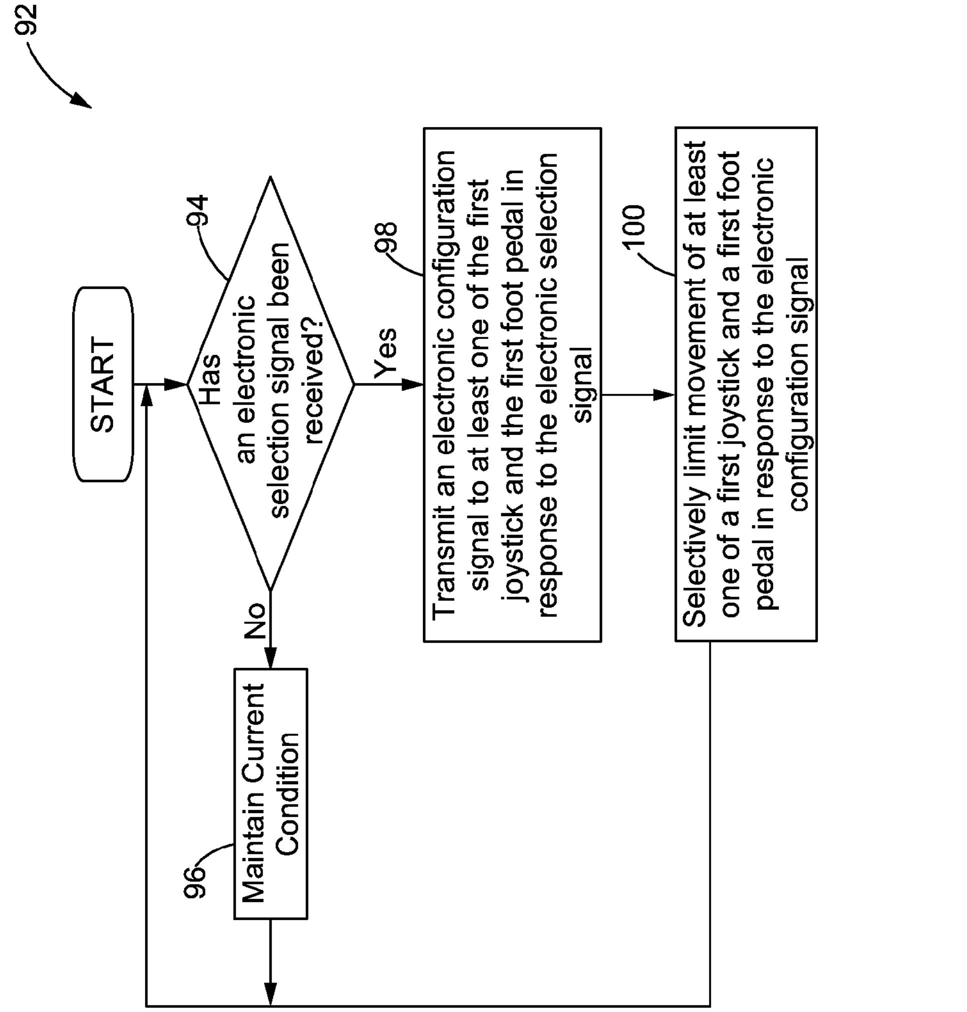
FIG. 6 is a flowchart illustrating exemplary steps of a method for operating a work machine in accordance with the present disclosure.

One exemplary example of an algorithm or electronic controller implemented method 92 for operating a work machine 10 is depicted in the flowchart of FIG. 6. As shown, the electronic controller 80 may be configured to continuously, periodically, or intermittently receive the electronic selection signal 78 at block 94. If no electronic selection signal 78 has been received, then the current condition may be maintained, as shown at block 96. If the electronic controller 80 has received the electronic selection signal 78, then it may transmit an electronic configuration signal 72 to at least one of the first joystick 24 and the first foot pedal 28 in response to the electronic selection signal 78 at block 98. Consequently, movement of at least one of the first joystick 24 and the first foot pedal 28 may selectively limited in response to the electronic configuration signal 72 at block 100. Subsequently, the algorithm or electronic controller implemented method 92 may return to block 94.

Figure 7:
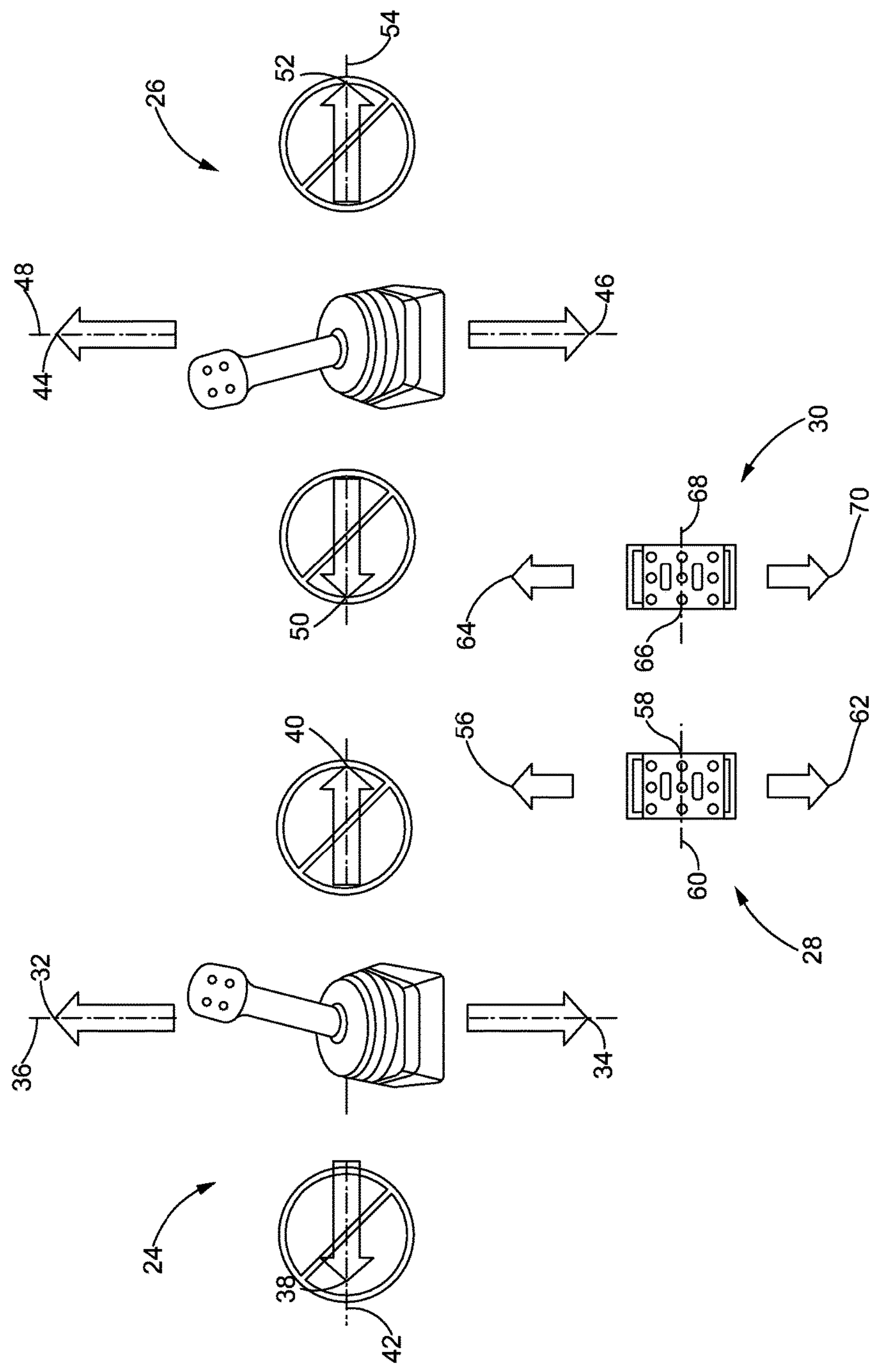
FIG. 7 is a schematic of a first configuration of the work machine operated in accordance with the method of FIG. 6.

A first configuration of the work machine operated in accordance with the method of FIG. 6 is schematically depicted in FIG. 7. As illustrated, selectively limiting the movement may include stopping movement of the first joystick 24 between the third position 38 and the fourth position 40 about the second rotational axis 36. Selectively limiting the movement may also include stopping movement of the second joystick 26 between the tenth position 50 and the eleventh position 52 about the fourth rotational axis 48.

Figure 8:
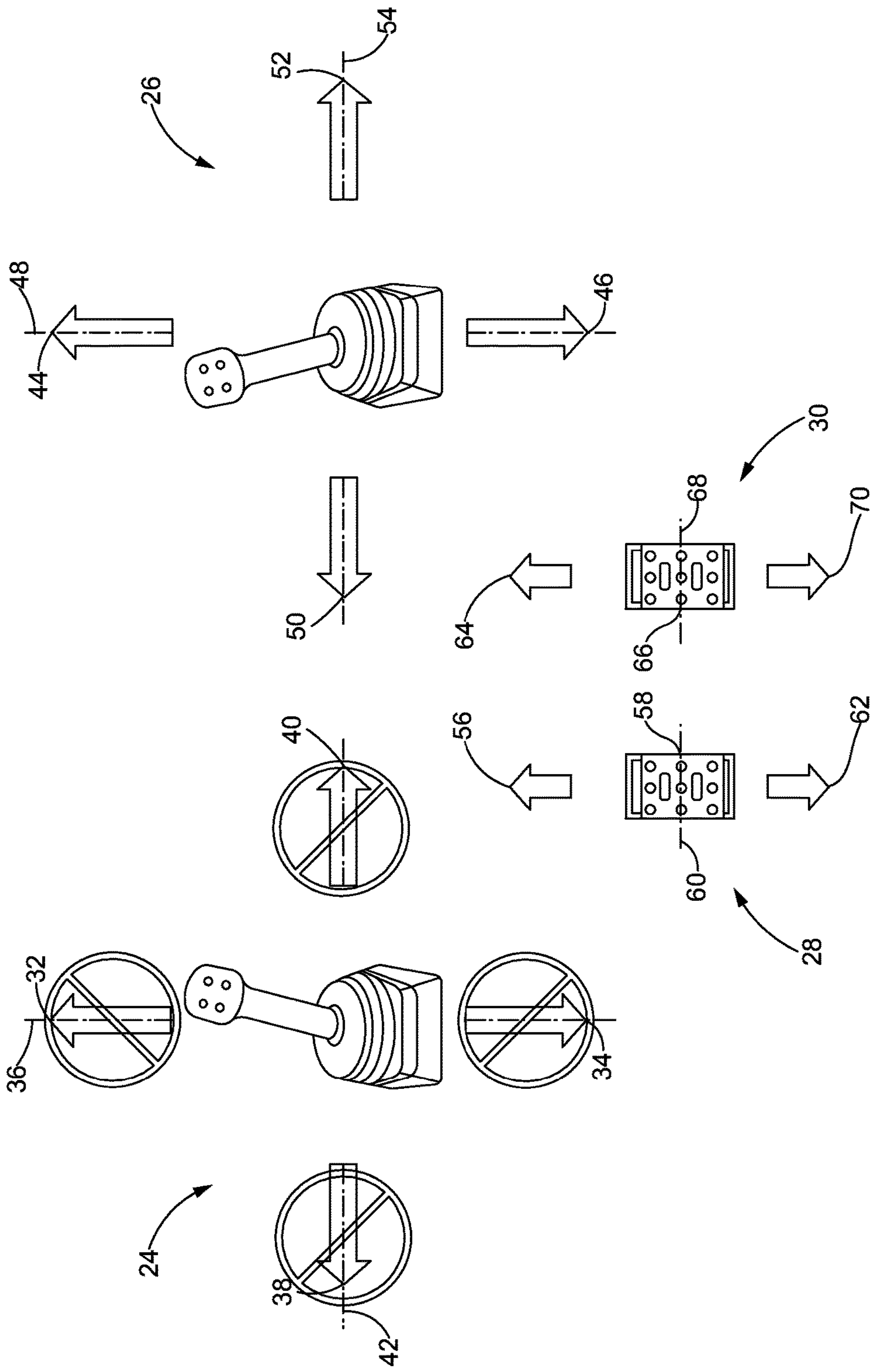
FIG. 8 is a schematic of a second configuration of the work machine operated in accordance with the method of FIG. 6.

A second configuration of the work machine 10 operated in accordance with the method of FIG. 6 is represented schematically in FIG. 8. As is seen therein, selectively limiting movement may include stopping movement of the first joystick 24 between the first position 32 and the second position 34 about the first rotational axis 42. The second configuration may also include stopping movement of the first joystick 24 between the third position 38 and the fourth position 40 about the second rotational axis 36.

Figure 9:
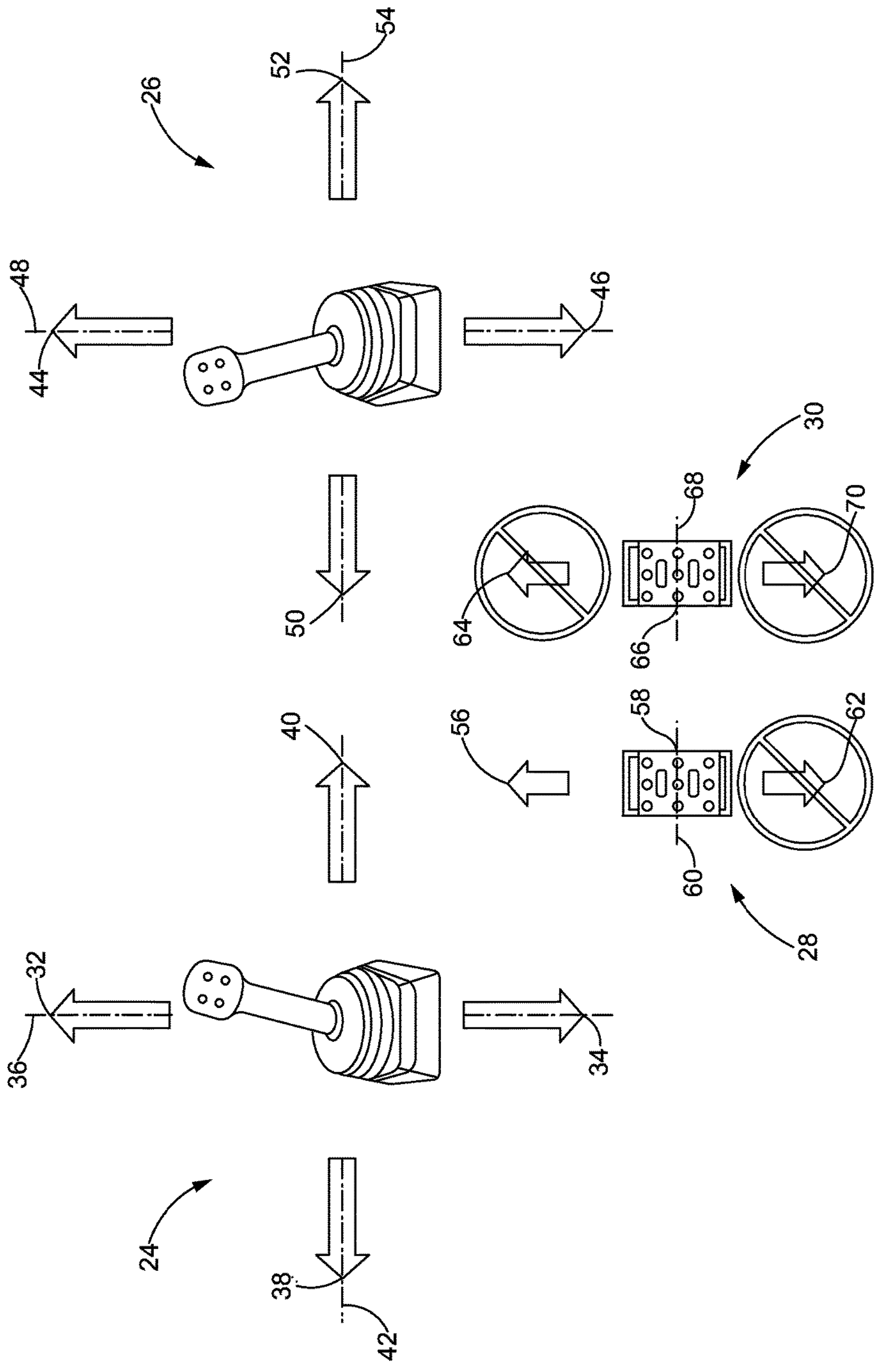
FIG. 9 is a schematic of a third configuration of the work machine operated in accordance with the method of FIG. 6.

FIG. 9 depicts a third configuration of the work machine 10 operated in accordance with the method of FIG. 6. Selectively limiting the movement may include stopping movement of the first foot pedal 28 between the sixth position 58 and the seventh position 62 about the fifth rotational axis 60. As is also illustrated, selectively limiting the movement may include stopping movement of the second foot pedal 30 between the twelfth position 64 and the thirteenth position 66 about the sixth rotational axis 68, and between the thirteenth position 66 and the fourteenth position 70 about the sixth rotational axis 68.

Figure 10:
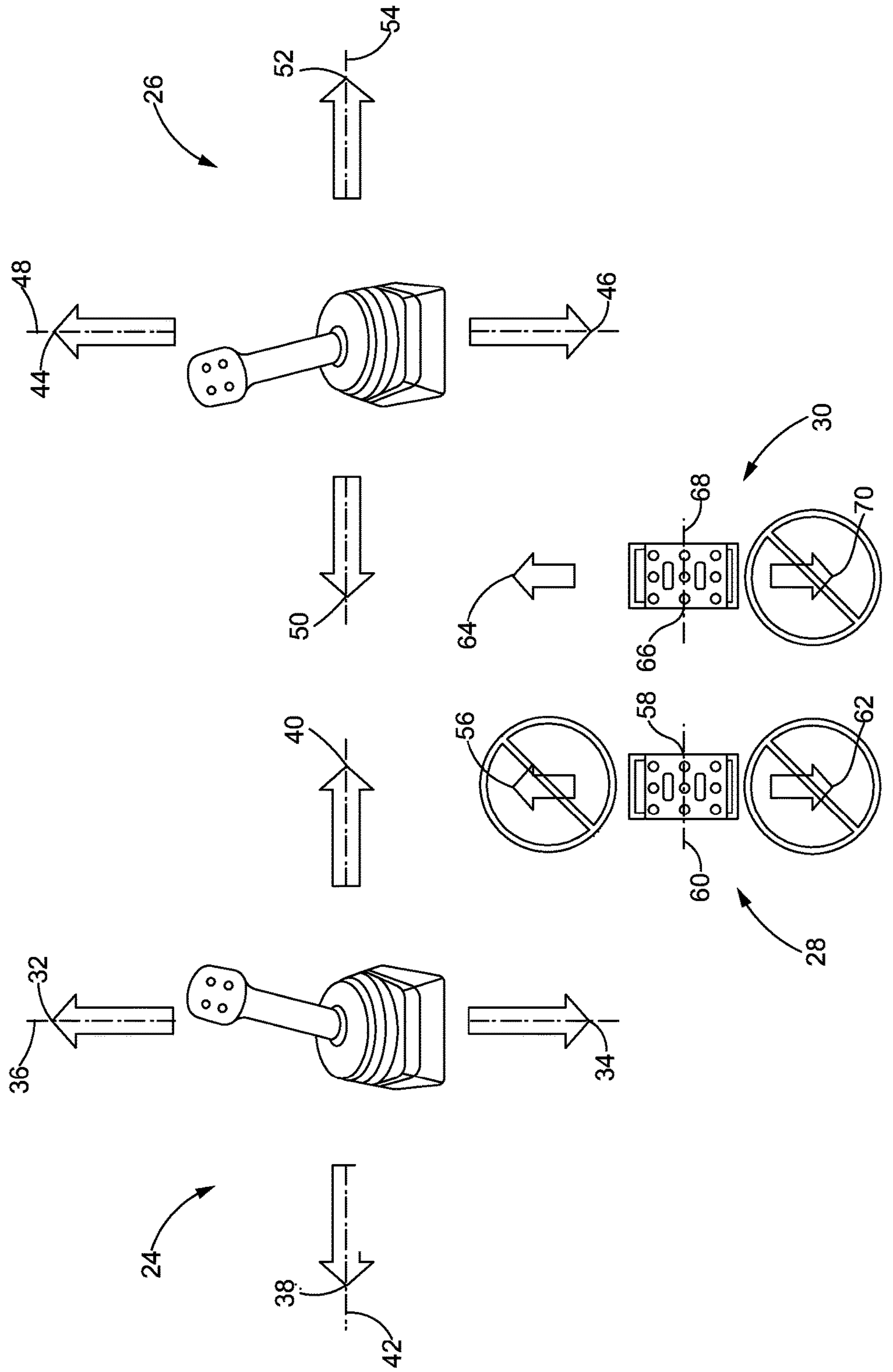
FIG. 10 is a schematic of a fourth configuration of the work machine operated in accordance with the method of FIG. 6.

FIG. 10 illustrates another configuration of the work machine 10 operated in accordance with the method of FIG. 6. As seen therein, selectively limiting movement may include stopping movement of the first foot pedal 28 between the fifth position 56 and the sixth position 58 about the fifth rotational axis 60. Selectively limiting movement may also include stopping movement of the first foot pedal 28 between the sixth position 58 and the seventh position 62 about the fifth rotational axis 60. This configuration may also include selectively stopping movement of the second foot pedal 30 between the thirteenth position 66 and the fourteenth position 70 about the sixth rotational axis 68.

Figure 11:
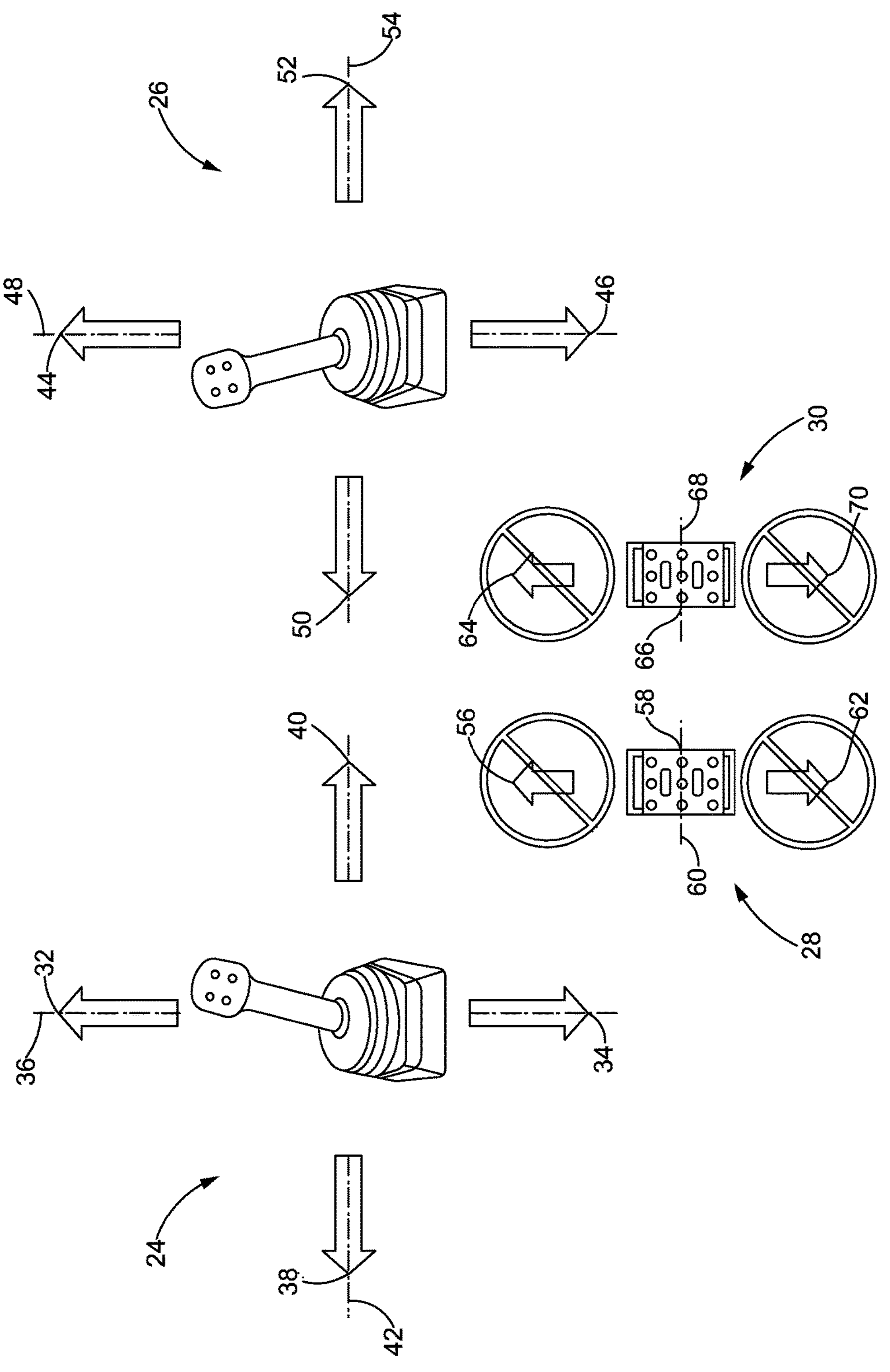
FIG. 11 is a schematic of a fifth configuration of the work machine operated in accordance with the method of FIG. 6.

Another configuration of the work machine 10 operated in accordance with the method of FIG. 6 is shown in FIG. 11. As depicted, selectively limiting movement may include stopping movement of the first foot pedal 28 between the fifth position 56 and the sixth position 58 about the fifth rotational axis 60, and between the sixth position 58 and the seventh position 62 about the fifth rotational axis 60. As is additionally illustrated, selectively limiting movement may include stopping movement of the second foot pedal 30 between the twelfth position 64 and the thirteenth position 66, and between the thirteenth position 66 and the fourteenth position 70, about the sixth rotational axis 68.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A control system for a work machine, comprising:

an input device configured to transmit an electronic selection signal;

an electronic controller in electronic communication with the input device and configured to receive the electronic selection signal and transmit an electronic configuration signal in response to the electronic selection signal; and a joystick in operative communication with at least one of a ground engaging member and a work implement and configured to regulate movement of at least one of the ground engaging member and the work implement, the joystick in electronic communication with the electronic controller and configured to move between a first position and a second position about a first rotational axis, and between a third position and a fourth position about a second rotational axis, the joystick further configured to receive the electronic configuration signal and be selectively non-movable between at least one of the first position and the second position and the third position and the fourth position in response to the electronic configuration signal.

2. The control system for a work machine according to claim 1, wherein the input device is selected from a group consisting of a switch, a computer, and an operator display.

3. The control system for a work machine according to claim 1, wherein the electronic configuration signal is a magnetic configuration signal, further wherein the joystick is a magnetically responsive joystick configured to receive the magnetic configuration signal and be selectively non-movable between at least one of the first position and the second position and the third position and the fourth position in response to the magnetic configuration signal.

4. The control system for a work machine according to claim 3, wherein the magnetically responsive joystick includes a magnetorheological material configured to increase its apparent viscosity in response to the magnetic configuration signal, further wherein the magnetically responsive joystick is configured to be selectively non-movable between at least one of the first position and the second position and the third position and the fourth position in response to the increase in apparent viscosity of the magnetorheological material.

5. The control system for a work machine according to claim 1, further including a foot pedal in electronic communication with the electronic controller configured to move between a fifth position and a sixth position about a fifth rotational axis, and between the sixth position and a seventh position about the fifth rotational axis, the foot pedal further configured to receive the electronic configuration signal and be selectively non-movable between at least one of the fifth position and the sixth position and the sixth position and the seventh position in response to the electronic configuration signal.

6. The control system for a work machine according to claim 5, wherein the electronic configuration signal is a magnetic configuration signal, further wherein the foot pedal is a magnetically responsive foot pedal configured to receive the magnetic configuration signal and be selectively non-movable between at least one of the fifth position and the sixth position and the sixth position and the seventh position in response to the magnetic configuration signal.

7. The control system for a work machine according to claim 6, wherein the magnetically responsive foot pedal includes a magnetorheological material configured to increase its apparent viscosity in response to the magnetic configuration signal, further wherein the magnetically responsive foot pedal is configured to be selectively non-movable between at least one of the fifth position and the sixth position and the sixth position and the seventh position in response to the increase in apparent viscosity of the magnetorheological material.

8. A work machine, comprising:

a frame;

a power source supported by the frame;

a ground engaging member rotatably associated with the power source and configured to move the work machine about a work site;

a work implement operatively coupled with a work arm;

an input device configured to transmit an electronic selection signal;

an electronic controller in electronic communication with the input device and configured to receive the electronic selection signal and transmit an electronic configuration signal in response to the electronic selection signal; and a joystick in operative communication with at least one of the ground engaging member and the work implement and configured to regulate movement of at least one of the ground engaging member and the work implement, the joystick in electronic communication with the electronic controller and configured to move between a first position and a second position about a first rotational axis, and between a third position and a fourth position about a second rotational axis, the joystick further configured to receive the electronic configuration signal and be selectively non-movable between at least one of the first position and the second position and the third position and the fourth position in response to the electronic configuration signal.

9. The work machine according to claim 8, wherein the input device is selected from a group consisting of a switch, a computer, and an operator display.

10. The work machine according to claim 8, wherein the electronic configuration signal is a magnetic configuration signal, further wherein the joystick is a magnetically responsive joystick configured to receive the magnetic configuration signal and be selectively non-movable between at least one of the first position and the second position and the third position and the fourth position in response to the magnetic configuration signal.

11. The work machine according to claim 10, wherein the magnetically responsive joystick includes a magnetorheological material configured to increase its apparent viscosity in response to the magnetic configuration signal, further wherein the magnetically responsive joystick is configured to be selectively non-movable between at least one of the first position and the second position and the third position and the fourth position in response to the increase in apparent viscosity of the magnetorheological material.

12. The work machine according to claim 8, further including a foot pedal in electronic communication with the electronic controller configured to move between a fifth position and a sixth position about a fifth rotational axis, and between the sixth position and a seventh position about the fifth rotational axis, the foot pedal further configured to receive the electronic configuration signal and be selectively non-movable between at least one of the fifth position and the sixth position and the sixth position and the seventh position in response to the electronic configuration signal.

13. The work machine according to claim 12, wherein the electronic configuration signal is a magnetic configuration signal, further wherein the foot pedal is a magnetically responsive foot pedal configured to receive the magnetic configuration signal and be selectively non-movable between at least one of the fifth position and the sixth position and the sixth position and the seventh position in response to the magnetic configuration signal.

14. The work machine according to claim 13, wherein the magnetically responsive foot pedal includes a magnetorheological material configured to increase its apparent viscosity in response to the magnetic configuration signal, further wherein the magnetically responsive foot pedal is configured to be selectively non-movable between at least one of the fifth position and the sixth position and the sixth position and the seventh position in response to the increase in apparent viscosity of the magnetorheological material.

* * * * *